US008623267B2

(12) United States Patent
Kanach

(10) Patent No.: US 8,623,267 B2
(45) Date of Patent: Jan. 7, 2014

(54) PRESSURE VESSEL

(75) Inventor: Roman Kanach, River Falls, WI (US)

(73) Assignee: Ecowater Systems LLC, Woodbury, MN (US)

( * ) Notice: Subject to any disclaimer, the term of this patent is extended or adjusted under 35 U.S.C. 154(b) by 113 days.

(21) Appl. No.: 12/770,363

(22) Filed: Apr. 29, 2010

(65) Prior Publication Data

US 2010/0212815 A1 Aug. 26, 2010

Related U.S. Application Data

(62) Division of application No. 11/829,204, filed on Jul. 27, 2007, now abandoned.

(60) Provisional application No. 60/820,688, filed on Jul. 28, 2006.

(51) Int. Cl.
*B29C 49/00* (2006.01)

(52) U.S. Cl.
USPC .......................................................... 264/523

(58) Field of Classification Search
None
See application file for complete search history.

(56) References Cited

U.S. PATENT DOCUMENTS 5,287,987 A * 2/1994 Gaiser ........................... 220/589
5,568,878 A * 10/1996 LeBreton ................... 220/62.19

* cited by examiner

*Primary Examiner* — Monica Huson
(74) *Attorney, Agent, or Firm* — R. Blake Johnston, Esq.; DLA Piper LLP US

(57) ABSTRACT

An improved molded, reinforced pressure vessel having a winding foot on the liner tank which includes a head, disposed away from the tank and a narrowed neck extending between the head and the tank wherein outer radial dimensions of the head are greater than outer radial dimension of the neck. The improved foot design allows windings to cover more of the liner tank that maximizes the reinforcement provided by the winding and in blow molded liner tanks, the narrow neck restricts the migration of material out of and away from the foot, thus producing a stronger liner tank.

7 Claims, 3 Drawing Sheets

PRESSURE VESSEL

CROSS-REFERENCE TO RELATED APPLICATIONS

This application is a divisional of U.S. application Ser. No. 11/829,204, filed Jul. 27, 2007, now abandoned that claims priority from U.S. Provisional Patent Application Ser. No. 60/820,688, filed Jul. 28, 2006.

FIELD OF THE INVENTION

The present invention relates to containers for holding pressurized contents and more particularly to molded, reinforced pressure vessels.

BACKGROUND OF THE INVENTION

Pressurized vessels have been used for many years. One form of pressurized vessel has a gas-tight liner with a cylindrical central section and two rounded, generally semispherical end portions. It is common for a port to be located at one longitudinal end of the vessel, at the center of one of the semispherical ends. Fibers are wound around the exterior surface of the liner, thereby strengthening the liner to form a vessel capable of containing pressurized contents. Such pressurized contents may be water, or other liquids, or gasses.

In construction, the liner is generally molded from plastic. One common form of molding liners is blow molding, where plastic (or other desirable liner material) is extruded or preformed into a tube or other desirable shape and then placed in a mold at an elevated temperature. Air is then forced into the center of the plastic, thereby forcing the soft plastic outward against the walls of the mold. The outer surface of the plastic takes the shape of the mold, while the inner surface of the plastic loosely follows the contours of the outer surface, thus forming a generally smooth inner surface.

One common problem with blow molded containers is the development of thin spots due to stretching of material around corners of the mold. The thin spots create weak portions of the liner, thus limiting its capability to hold pressurized material.

One feature that is used during the manufacturing process of the pressure vessels described above is a “foot” located at one longitudinal end of the liner (usually the end opposing the port of the container). The liner is gripped at the foot during winding of the fibers. Some manufacturers mold the liner and then affix a foot to the liner after molding. The extra step of adding the foot adds cost and time to the liner making process. To overcome this, some manufacturers have tried to mold a foot onto the liner during the blow molding process. Thin spots are located proximate the inside corners and the center of the foot. These thin spots lead to weakening of the liner, and thus decreased stress resistance and reduced performance of the pressure vessel.

Generally, resin coated fibers are wound around the liner in various directions. Fibers are wound radially around the tubular center section of the liner. The radial windings may form one or more layers and usually do not cover the end portions of the liner. Fibers are also wound longitudinally around the liner. The longitudinal windings are generally wrapped around the ends of the vessel in a number of directions, thereby encircling the foot and providing structural reinforcement to the covered portions. Radial windings may be applied first, followed by longitudinal windings, or vice versa. The windings are wrapped tangentially around the foot to cover the entire end of the vessel. Once the fibers are wrapped, the resin is cured to provide a strong pressure vessel.

Generally, fibers are not wound over the foot, leaving an unreinforced portion at one end of the liner. Thus, the foot presents a potential weak spot in the pressure vessel. It would be beneficial to provide a vessel design which minimizes the unreinforced area and thin spots in the liner.

BRIEF DESCRIPTION OF THE DRAWINGS

For the purpose of illustrating the invention, the drawings show forms of the invention that are presently preferred. However, it should be understood that this invention is not limited to the precise arrangements and instrumentalities shown in the drawings.

DESCRIPTION OF PREFERRED EMBODIMENTS

Figure 1:
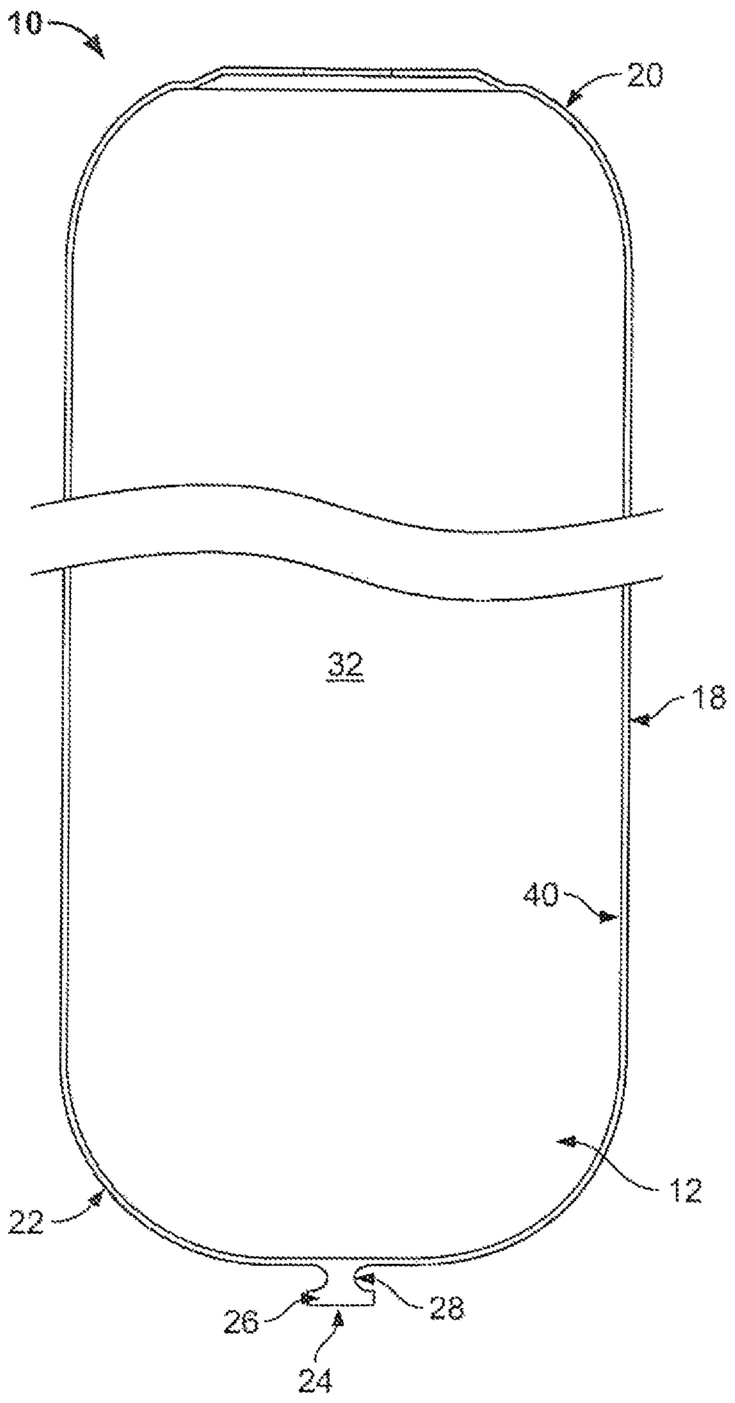
FIG. 1 is a side elevational view of a pressure vessel according to an embodiment of the present invention.
Figure 2:
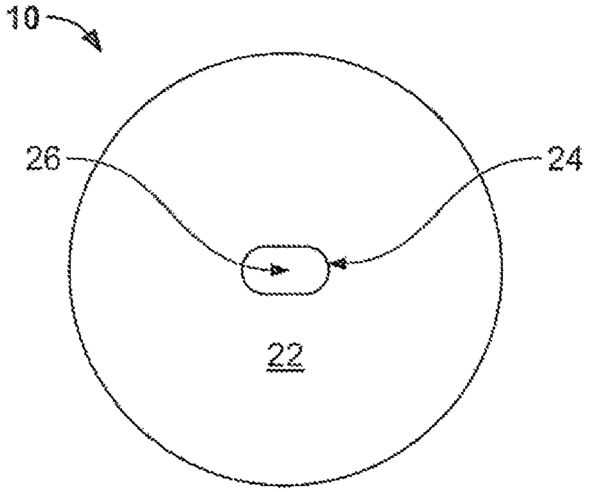
FIG. 2 is a bottom plan view of a pressure vessel according to an embodiment of the present invention.
Figure 3:
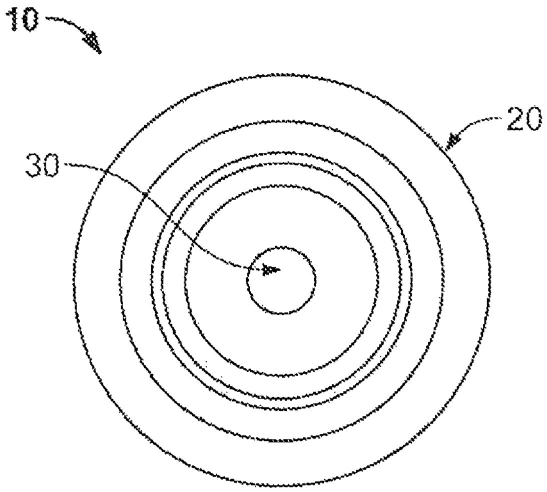
FIG. 3 is a top plan view of a pressure vessel according to an embodiment of the present invention.

Referring now to the drawings where like numerals indicate like elements, there is shown an exemplary embodiment of a pressure vessel according to the present invention, which is generally referred to by the numeral 10. The pressure vessel 10 is primarily intended for use as a container for pressurized liquids or gasses. In a particularly preferred embodiment, the pressure vessel is used as a pressurized container in water softener or water treatment devices and applications.

Figure 4:
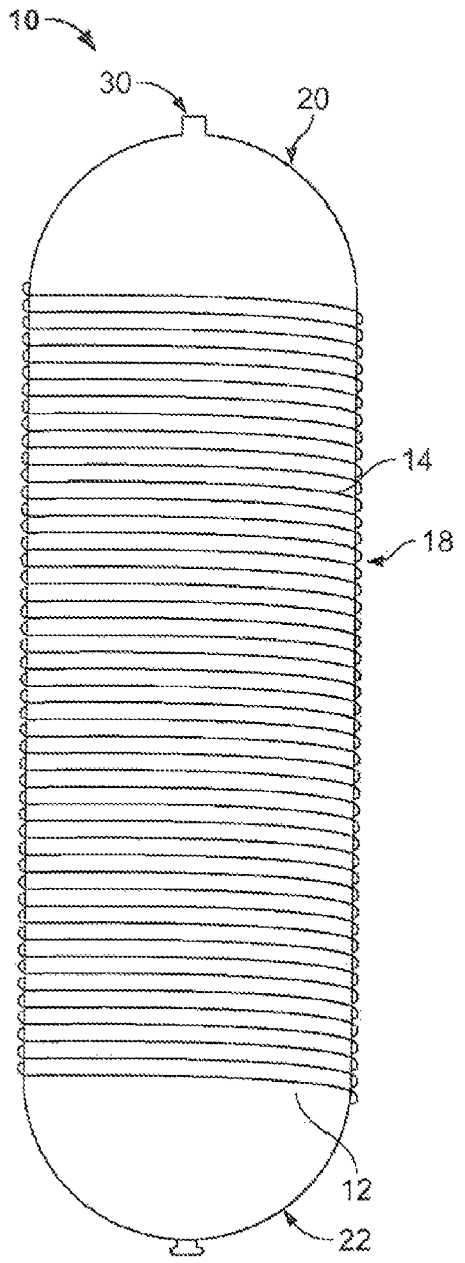
FIG. 4 is a side elevational view of a pressure vessel having a radial winding, according to an embodiment of the present invention.
Figure 5:
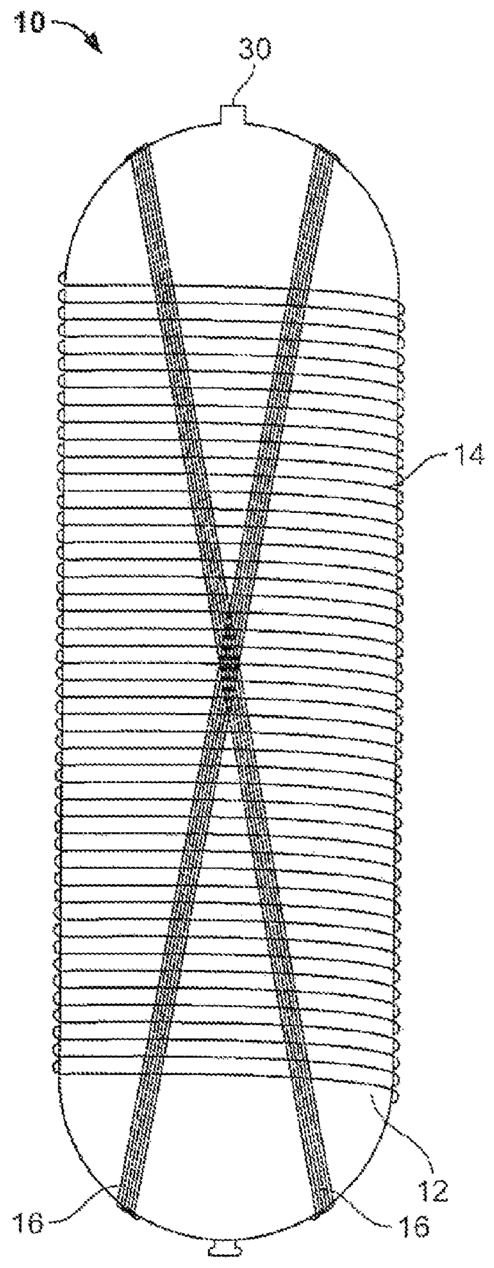
FIG. 5 is a front elevational view of a pressure vessel, having a radial winding and a partial longitudinal winding, according to an embodiment of the present invention.

FIGS. 1-5 show pressure vessels 10 constructed according to an embodiment of the present invention. The vessels 10 have a liner tank 12, covered by radial windings 14 and longitudinal windings 16, as is best seen in FIGS. 4 and 5. The vessel 10, which generally follows the shape of the liner tank 12, has a generally tubular center section 18 with rounded end portions 20, 22 at opposing longitudinal ends of the center section 18. The end portions 20, 22 may be semispherical or have some other rounded configuration, without sharp edges, that facilitates the longitudinal winding of fibers around the liner tank 12. A port 30 is disposed at the first end of the vessel 10 and a foot 24 is disposed at the second end 22. Those skilled in the art will recognize that the vessel may have a number of variations from the general shape described above without departing from the scope of the present invention.

The figures show various views of the second longitudinal end 22 of a liner tank 12. The foot 24 extends longitudinally away from the second end 22. As best shown in FIG. 1, the foot 24 has a head 26 and a neck 28 extending between the head 26 and the liner tank 12. The foot 24 has a generally oblong profile, with the head 26 being wider and longer than the neck 28. The head 26 is sized and shaped to facilitate the engagement of the foot 24 with equipment used to wind the fibers 14, 16 around the liner tank 12. The shape of the foot 24 may vary as long as a narrow neck 28 portion is provided with a head 26 which is dimensionally larger than the neck 28.

On prior art vessels, neck portions were at least as large as the head. However, in the embodiment shown in FIGS. 1-5, the neck 28 is narrower than the head 26. The narrow neck 28 allows the longitudinal windings 16 to cover more of the second end 22 of the vessel, thus strengthening the vessel 10. FIGS. 4 and 5 show longitudinal windings 16 wrapped around the neck 28, under the head 26. Thus, the vessel 12 has increased strength, due to the increased area covered by the longitudinal winding 16, over vessels of the prior art.

In vessels that are constructed using blow molding, such as the one shown in the figures, the narrow neck 28 design also adds strength by minimizing thin spots in the liner tank 12. During the molding process, the liner tank material fills the foot portion 24 of a mold. When pressurized gas, such as air, is blown into the center of the material, the liner material expands to the walls of the mold. In the present embodiment, during molding, the liner material thickness in the second end 22 stays constant because the foot portion 24 has a narrow neck 28 which restricts the flow of air into the foot portion 24 and the migration of liner material out of the foot portion 24.

An interior surface 32 of the liner tank 12 defines the interior of the vessel 10. As mentioned above, the liner wall 40 thickness is generally constant across the second end 22. During molding, a small impression (not shown) forms inside of the liner tank 12, adjacent the foot 24. The impression is shallow enough that there are no thin spots formed in the liner wall 40.

The improvements shown in the vessel 10 in view of those formed using other prior art techniques is highlighted in that weak spots in a prior art vessel are formed at the tip of the foot and where there are sharp corners formed on the foot. In the present invention the foot 24 has a narrow neck 28, thus restriction the migration of material away from the foot 24 during molding. This leads to a robust second end 22 and a stronger vessel 10.

In summary, the vessel 10 is stronger than those seen in the prior art because of the design of foot 24, for example. The foot 24 has a narrow neck 28, thus allowing windings to cover more of the liner tank 12, maximizing the reinforcement provided by the winding. Furthermore, in blow molded liner tanks, the narrow neck 28 restricts the migration of material out of and away from the foot 24, thus producing a stronger liner tank 12.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. A method of making a pressure vessel comprising the steps of:

a) providing a mold featuring walls defining a generally tubular center section and two generally rounded end portions located one each at opposing longitudinal ends of the center section, said mold walls also defining a foot portion in communication with a first one of the rounded end portions of the mold, said foot portion having a head portion and a neck portion with the neck portion extending between the head portion and the first one of the rounded end portions of the mold, said neck portion of the mold being dimensionally narrower than the head portion of the mold;

b) inserting a material into the mold;

c) blowing pressurized gas into the center of the material so that the material expands to the walls of the mold so that a pressure vessel is formed;

d) restricting the flow of air into the foot portion of the mold using the neck portion of the mold so that migration of material out of the foot portion of the mold is restricted so that the material entirely fills the foot portion of the mold so that the foot portion of the mold forms a closed end of the vessel.

2. The method of claim 1 wherein the material includes a plastic.

3. The method of claim 1 further comprising the steps of:

radially winding a fiber material about a center section of the pressure vessel; and longitudinally winding the fiber material outwardly of the radial winding and in a general longitudinal direction about the pressure vessel.

4. The method of claim 3 wherein the fiber is a resin coated fiber.

5. The method of claim 1 wherein the pressure vessel formed in step c) has a material thickness that is generally constant across a generally rounded end portion upon which the foot is formed.

6. The method of claim 1 wherein the head portion of the mold has an oblong profile.

7. The method of claim 6 further comprising the steps of:

e) providing equipment for winding fibers about the vessel;

f) engaging the foot with the equipment;

g) winding fibers about the vessel using the equipment.

* * * * *